(12) United States Patent
van der Meijden (10) Patent No.: US 12,292,751 B2
(45) Date of Patent: May 6, 2025

(54) BYPASS MECHANISM FOR AUTOMATIC POOL CLEANERS

(71) Applicant: ZODIAC POOL SYSTEMS LLC, Carlsbad, CA (US)

(72) Inventor: Hendrikus Johannes van der Meijden, Glen Austin (ZA)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 393 days.

(21) Appl. No.: 17/370,572

(22) Filed: Jul. 8, 2021

(65) Prior Publication Data
US 2022/0043467 A1 Feb. 10, 2022

Related U.S. Application Data

(60) Provisional application No. 63/061,484, filed on Aug. 5, 2020.

(51) Int. Cl.
*G05D 7/06* (2006.01)
*C02F 1/00* (2023.01)
(Continued)

(52) U.S. Cl.
CPC ........... *G05D 7/0635* (2013.01); *C02F 1/008* (2013.01); *F04D 15/0027* (2013.01);
(Continued)

(58) Field of Classification Search
CPC ........ C02F 1/008; C02F 1/00; C02F 2103/42; C02F 2201/005; F04D 15/0027;
(Continued)

(56) References Cited

U.S. PATENT DOCUMENTS 4,086,933 A * 5/1978 Pansini ................. E04H 4/1672
239/66
2004/0040581 A1* 3/2004 Bruwer ................ E04H 4/1654
15/409
(Continued)

FOREIGN PATENT DOCUMENTS

| EP | 1557508 | 7/2005 |
| WO | 02068778 | 9/2002 |
| WO | 2011116046 | 9/2011 |

OTHER PUBLICATIONS

International Application No. PCT/US2021/040882, International Search Report and Written Opinion, mailed on Oct. 15, 2021, 12 pages.
(Continued)

*Primary Examiner* — Akash K Varma
(74) *Attorney, Agent, or Firm* — Kilpatrick Townsend & Stockton LLP (57) ABSTRACT

A bypass mechanism for automatic swimming pool cleaners (APCs) is detailed herein. The bypass mechanism may be a valve or other mechanical device that limits operation of the APC by diverting water away from the APC or otherwise ceasing operation of the APC after a predetermined period of time (e.g., after the desired run-time for the APC has been reached). In this way, the bypass mechanism limits the time the APC operates, even if the pump that otherwise would drive the APC remains energized.

8 Claims, 5 Drawing Sheets

(51) Int. Cl.
  *F04D 15/00* (2006.01)
  *F16K 1/20* (2006.01)
  *C02F 103/42* (2006.01)
  *E04H 4/16* (2006.01)
  *F04D 1/00* (2006.01)

(52) U.S. Cl.
  CPC ........ *F16K 1/2007* (2013.01); *C02F 2103/42* (2013.01); *C02F 2201/005* (2013.01); *E04H 4/1654* (2013.01); *F04D 1/00* (2013.01)

(58) Field of Classification Search
  CPC .. F04D 15/00; F04D 15/0011; F04D 15/0022; F16K 1/2007; F16K 1/20; G05D 7/0635; G05D 7/06; E04H 4/1654; E04H 4/1645; E04H 4/1672; E04H 4/16; E04H 4/06
  USPC ...................................................... 210/739
  See application file for complete search history.

(56) References Cited

U.S. PATENT DOCUMENTS

| | | | |
|---|---|---|---|
| 2005/0155655 A1* | 7/2005 | Campbell | E04H 4/1654 137/624.11 |
| 2009/0025812 A1* | 1/2009 | Campbell | E04H 4/1654 137/861 |
| 2011/0226361 A1* | 9/2011 | Van Der Meijden | E04H 4/1672 134/184 |

OTHER PUBLICATIONS

International Application No. PCT/US2021/040882, International Preliminary Report on Patentability mailed on Feb. 16, 2023, 9 pages.
European Application No. 21749045.7, Office Action mailed on Nov. 29, 2024, 3 pages.

* cited by examiner

BYPASS MECHANISM FOR AUTOMATIC POOL CLEANERS

CROSS REFERENCE TO RELATED APPLICATION

This application claims the benefit of and priority to U.S. Provisional Patent Application Ser. No. 63/061,484, filed Aug. 5, 2020, the entire contents of which are hereby incorporated herein this reference.

FIELD OF THE INVENTION

This invention relates to devices for regulating operation of automatic pool cleaners for liquid-containing bodies such as swimming pools and spas.

BACKGROUND

Pressure-side pool cleaners and suction-side pool cleaners are types of automatic pool cleaners (APCs). Pressure-side cleaners connect directly or indirectly to an outlet of a pump of a swimming pool's water-circulation system. In these APCs, pressurized water exiting the pump is used, employing the Venturi principle, to create a low-pressure area configured to draw debris-laden water into the inlet of the APC. When the pump is on, water exiting the pump will cause the APC to operate. Suction-side cleaners connect, via a hose, to an inlet of a pump of a swimming pool's water-circulation system. When the pump is on, the pump evacuates the cleaner, drawing debris-laden water from the swimming pool through the cleaner and into the hose for eventual travel to a filter that separates and removes debris from the water.

SUMMARY

Bypass mechanisms for pressure-side, suction-side or other automatic swimming pool cleaners (APCs) are detailed herein. Although the bypass mechanisms are described in detail with reference to pressure-side cleaners, the technology could be applied to suction-side cleaners, cleaners operated by a booster or boosterless pump, and others. The bypass mechanism may be a valve or other mechanical device that limits/regulates operation of the APC even if the pump remains on. For pressure-side APCs, the bypass mechanism limits/regulates operation of the APC by diverting water from the pump away from the APC after a predetermined period of time (e.g., after the desired run-time for the APC has been reached). By diverting water away from the APC, the APC ceases operation. For example, the bypass mechanism may be designed so the APC ceases operation after sufficient time has passed for the APC to efficiently and effectively clean the pool, which may be before the pump turns off (e.g., the APC may be designed so it cleans the pool in 2 or so hours, while the pump is required to filter the swimming pool water for at least 8 or so hours).

In some cases, the bypass mechanism may be used with APCs that are being driven by a filter pump, which may run longer than the time needed to clean the swimming pool or other body of water. Limiting operation of the APC in this way saves the APC from unnecessary run time and the accompanying maintenance, and also extends the life of the APC.

BRIEF DESCRIPTION OF THE DRAWINGS

The specification makes reference to the following appended figures, in which use of like reference numerals in different figures is intended to illustrate like or analogous components.

DETAILED DESCRIPTION

Disclosed herein are devices, such as bypass mechanisms, for limiting/regulating operation of an automatic swimming pool cleaner (APC) while the pump that would otherwise operate the APC is running. The bypass mechanisms are designed to cease operation of the APC (e.g., by diverting water away from the APC) after a predetermined period of time (e.g., after the desired run-time for the APC has been achieved). In this way, the bypass mechanism controls how long the APC operates, even if the pump that would otherwise drive the APC remains on.

The bypass mechanism is fluidly connected to a pump of a swimming pool or spa (or other body of water) and also fluidly connected to the APC. In some embodiments, the bypass mechanism is positioned downstream of the pump and upstream of the APC. In one non-limiting example, the bypass mechanism sits within a hose connecting the APC with the pump. In other embodiments, the bypass mechanism can be housed inside the APC. When the bypass mechanism is in its closed position, water from the pump is permitted to move through the bypass mechanism to the APC. When the bypass mechanism is in its open position, water from the pump is diverted so it does not reach the APC.

The bypass mechanism is designed to start a predetermined timed cycle when the pump is switched on. The predetermined timed cycle can correspond to the amount of time required for the APC to clean the body of water or otherwise complete operation. Once the predetermined timed cycle finishes, the bypass mechanism will have moved from the closed position (in which water from the pump flows to the APC in the case of a pressure-side APC) to the open position (in which the bypass mechanism diverts the water flow away from the pressure-side APC, for example to the body of water). When starved of water, the pressure-side APC is rendered inactive and ceases operation.

When the pump is de-energized (switched off) after the predetermined timed cycle has completed, the bypass mechanism resets and returns to the closed position, ready to start another predetermined timed cycle when the pump switches back on. If the pump is turned off (de-energized) in the middle of the predetermined timed cycle, the bypass mechanism will not reset, but will resume the uncompleted timed cycled when the pump is switched back on. In this way, the APC will be able to complete its operation when the pump is turned back on (re-energized).

Figure 1:
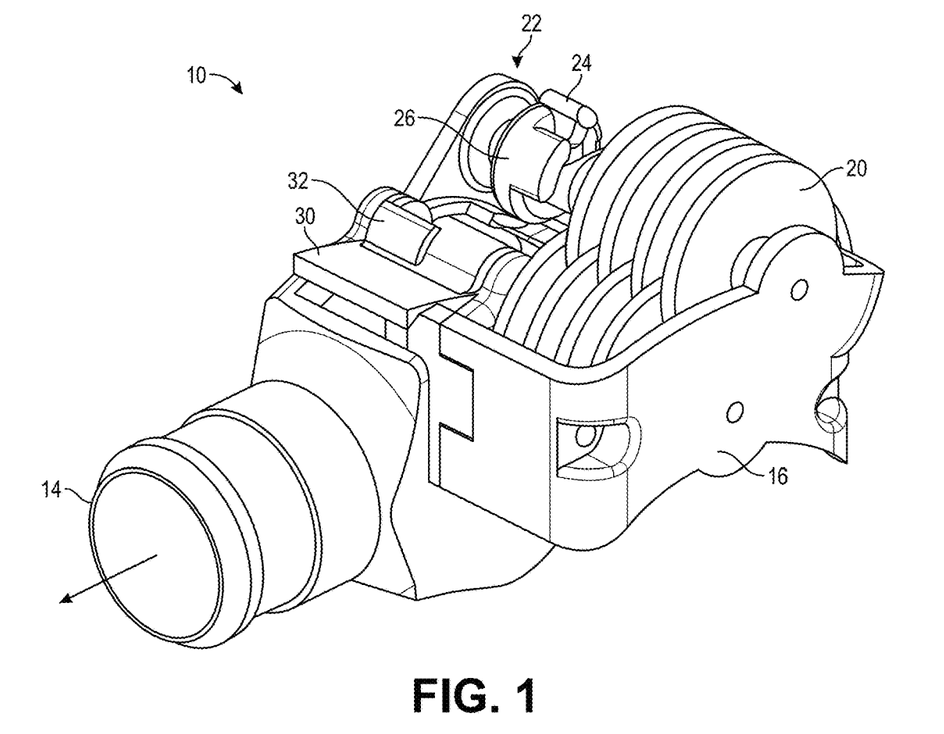
FIG. 1 is a perspective view of an assembled bypass mechanism, according to embodiments, illustrated for use with a pressure-side APC.
Figure 2:
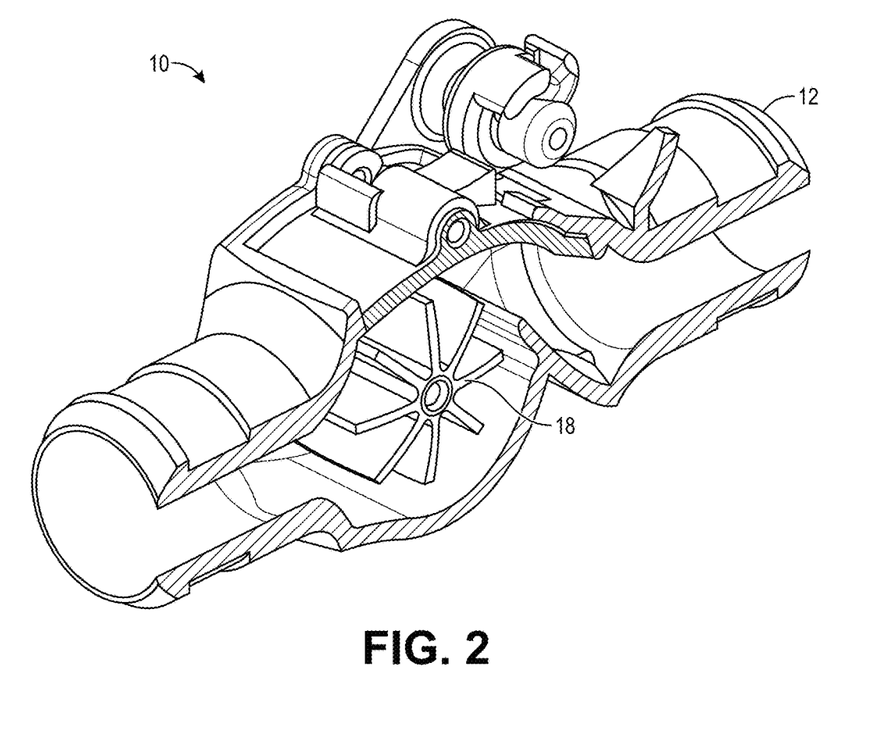
FIG. 2 is a cut-away view of the bypass mechanism of FIG. 1.

FIG. 1 illustrates an exemplary bypass mechanism 10 having a body 16. As shown in FIGS. 1-2, bypass mechanism 10 includes an inlet 12 and an outlet 14. When used with pressure cleaners the inlet 12 is fluidly connected to the pump to receive water from the pump and the outlet 14 is fluidly connected with a pressure-side APC to supply water to the APC. The bypass mechanism 10 is illustrated and described with reference to a pressure-side APC. However, those skilled in the art will recognize that the bypass mechanism could be arranged to operate instead with a suction-side APC, in which case the water flow would be reversed (e.g., water would be drawn from the APC through the bypass mechanism and toward the pump, in which case the bypass valve's inlet would be fluidly connected to the suction side APC and the outlet would be fluidly connected to the pump), and in which case the bypass mechanism would control whether the pump were permitted to draw water from the suction-side APC.

Bypass mechanism 10 also includes drive rotor 18 (FIG. 2) driveably connected to a gear stack 20. Gear stack 20 in turn is driveably connected to a cam assembly 22, the cam assembly 22 including a cam 24 and a cam pusher 26, such that rotation of the gear stack 20 rotates the cam assembly 22. In some cases, the drive rotor 18 is configured to indirectly rotate the cam assembly 22. In some cases, one complete rotation of the cam pusher 26 corresponds to one predetermined timed cycle. As described in more detail below, a cam biasing mechanism, such as a spring, biases the cam 24 against the cam pusher 26.

Bypass mechanism 10 also includes a door or flap 30 that is upstream of the drive rotor 18 (e.g., water from the inlet 12 reaches the flap 30 before it reaches the drive rotor 18). The flap 30 forms part of the outer wall of the body 16 of the bypass mechanism 10. When bypass mechanism 10 is in the closed position (FIGS. 1-3 and 10), the flap 30 is in a closed position that allows water from the inlet 12 to flow through the drive rotor 18 to the outlet 14. Flap 30 is biased into the closed position by a flap biasing mechanism, such as a spring, as discussed in more detail below. The flap 30 is configured as a toggle-style door to move between the closed position, where it forms a seal against the body 16 of the bypass mechanism 10, and an open position, where the flap 30 blocks water from the inlet 12 from reaching the drive rotor 18 and the outlet 14. As described in more detail below, the flap 30 remains in position unless acted on by the cam assembly 22. Unlike traditional valves, operation of the drive rotor 18 by itself does not cause the flap 30 to move between its open and closed positions.

Figure 3:
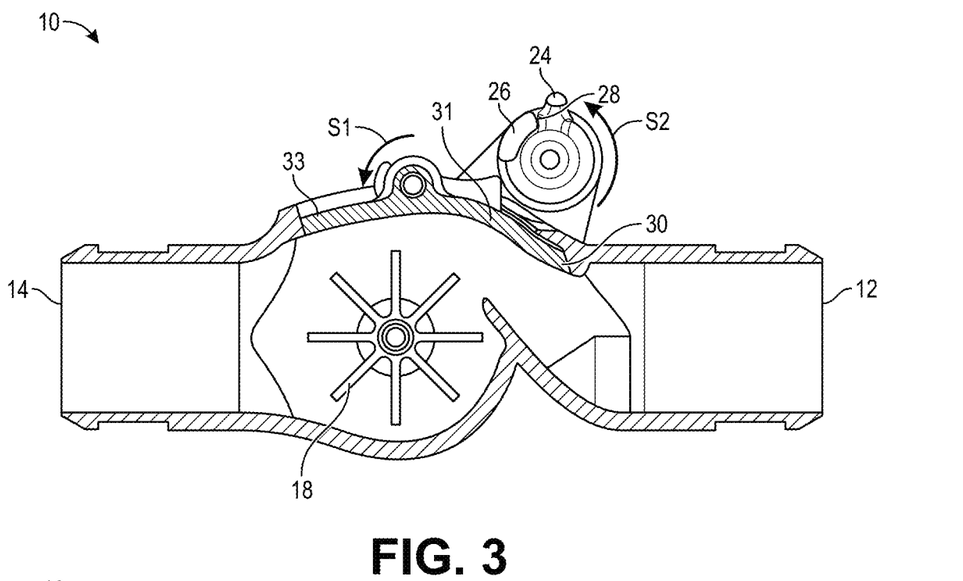
FIG. 3 is a side, cross-sectional view of the bypass mechanism of FIG. 1 shown in the closed position.

In some embodiments, as shown in FIGS. 2-10, the flap 30 is hinged. In some cases, the flap 30 can be hinged at its center or approximately at the center of the flap 30. As shown in FIG. 3, the hinge may be positioned so the flap 30 is longer on the upstream side 31 of the flap (e.g., the portion of the flap 30 closer to the inlet 12) than the downstream side 33 of the flap (e.g., the portion of the flap 30 closer to the outlet 14). Such a configuration reduces the force required by the cam 24 to move the bypass mechanism 10 from its closed position to its open position, as the water pressure on the shorter, downstream side 33 of the hinged flap 30 balances forces on the flap 30. This configuration also opens a hole behind the flap 30 to neutralize any leaked water past tolerances on the flap 30, ensuring minimal or no rotation of the rotor/turbine inside the APC. Optionally, the flap 30 may have a protrusion (not shown) on an inside face to mechanically interface with the drive rotor 18 to help ensure the flap 30 remains stationary when in position.

FIG. 3 illustrates the bypass mechanism 10 in the closed position, in which water pressure keeps the flap 30 sealed against the body 16 so water from the inlet 12 flows through the drive rotor 18 and through the outlet 14 to the APC. A flap biasing mechanism such as a spring (S1 in FIG. 3) biases the flap 30 into its closed position (i.e., the spring exerts force in a counterclockwise direction on the downstream side 33 of the flap 30). A cam biasing mechanism such as a spring (S2 in FIG. 3) biases the cam 24 against a distal surface 28 of the cam pusher 26 (e.g., in a counterclockwise direction) so the cam 24 is in contact with the cam pusher 26 in the closed position.

Figure 4:
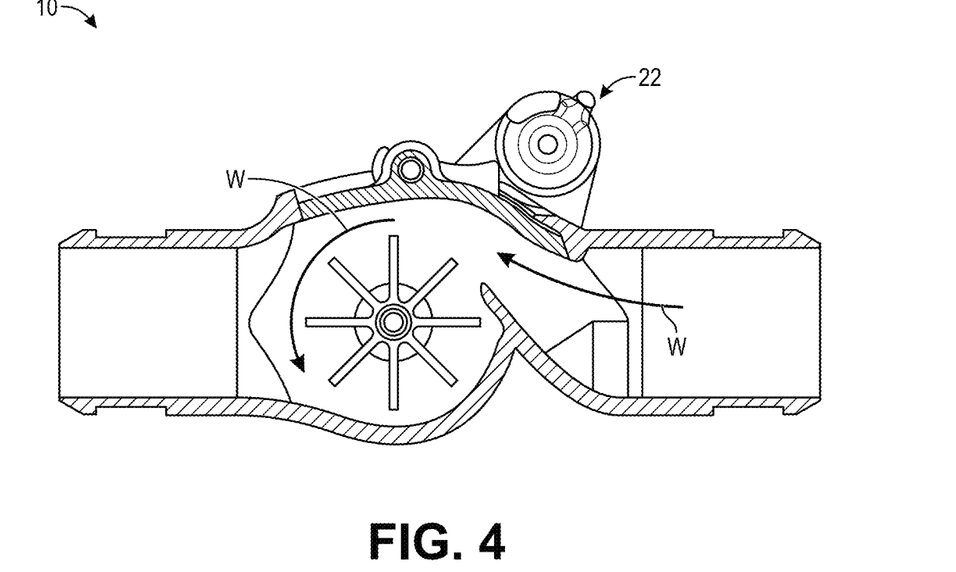
FIGS. 4-8 show the bypass mechanism of FIG. 1 as it moves from the closed position to the open position.
Figure 5:
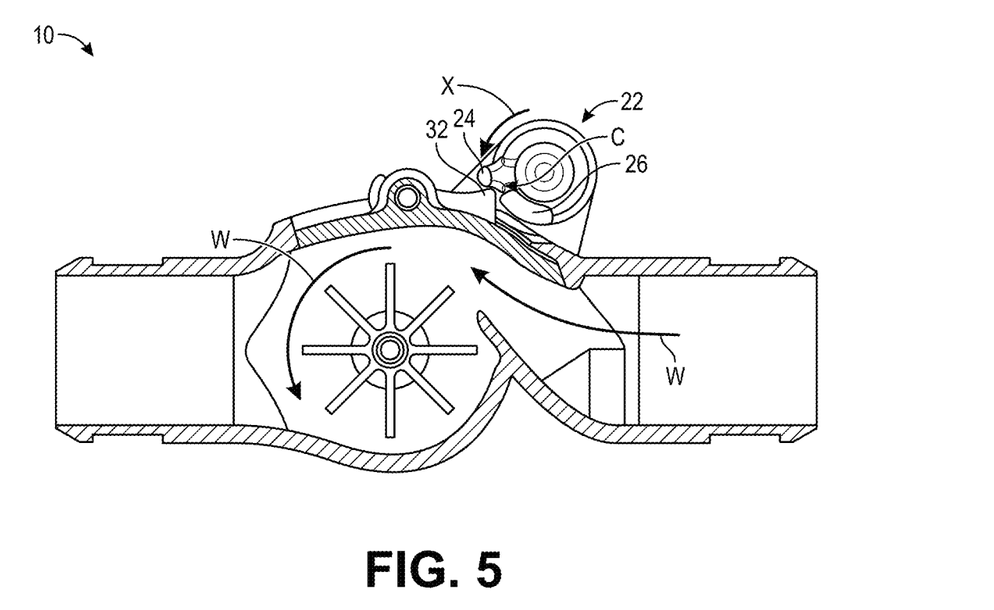

FIGS. 4-5 illustrate how water flowing through the bypass mechanism 10 from the inlet 12 (represented by arrows W) rotates the drive rotor 18, which in turn rotates the gear stack 20 connected to the cam assembly 22 and thus the cam assembly 22. In the embodiment shown, cam assembly 22 rotates in a counterclockwise direction (represented by arrow X in FIG. 5), in the same direction as the force applied by the cam biasing mechanism S2. As the cam assembly 22 begins to rotate, the bypass mechanism 10 is still in a closed position where flap 30 is sealed against the body 16, so water from the inlet 12 is permitted to flow through the drive rotor 18 and through the outlet 14 to the APC.

As shown in FIG. 5, a projection 32 extends from the flap 30, the projection 32 configured to interact with the cam 24 (illustrated by arrow C) as the cam assembly 22 rotates. In some embodiments, the projection 32 is located on the upstream side 31 of the flap 30 (e.g., the portion of the flap 30 closer to the inlet 12). Projection 32 can be any suitable shape and profile, so long as it is dimensioned to project into the path of the cam assembly 22 such that the cam pusher 26 clears the projection 32 without contacting the projection 32 as it passes, but the cam 24 contacts the projection 32. The biasing mechanism S2 is tensioned so it cannot overcome the force exerted by the projection 32 on the cam 24 due to the force exerted by the biasing mechanism S1 keeping the flap 30 in the closed position. Thus, while the drive rotor 18 continues to rotate the cam assembly 22, the cam 24 decouples from the cam pusher 26 and remains positioned against the projection 32, while the cam pusher 26 continues to rotate in a counterclockwise direction with the cam assembly 22 (as indicated by arrow D in FIG. 6).

Figure 6:
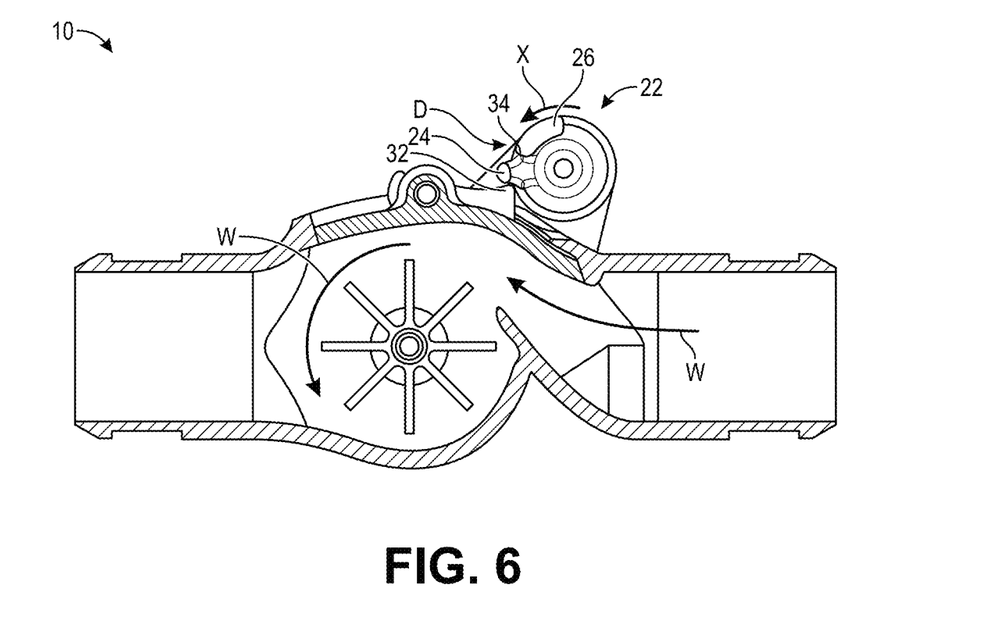

As shown in FIG. 6, the cam pusher 26 continues to rotate until it approaches its original starting position and a proximal surface 34 of the cam pusher 26 contacts the cam 24 (which remains positioned against the projection 32). Continued rotation of the cam assembly 22 (via the gear stack 20 and the drive rotor 18) causes the cam pusher 26 to exert force on the cam 24, causing the cam 24 to push downwards against the projection 32 of the flap 30.

Figure 7:
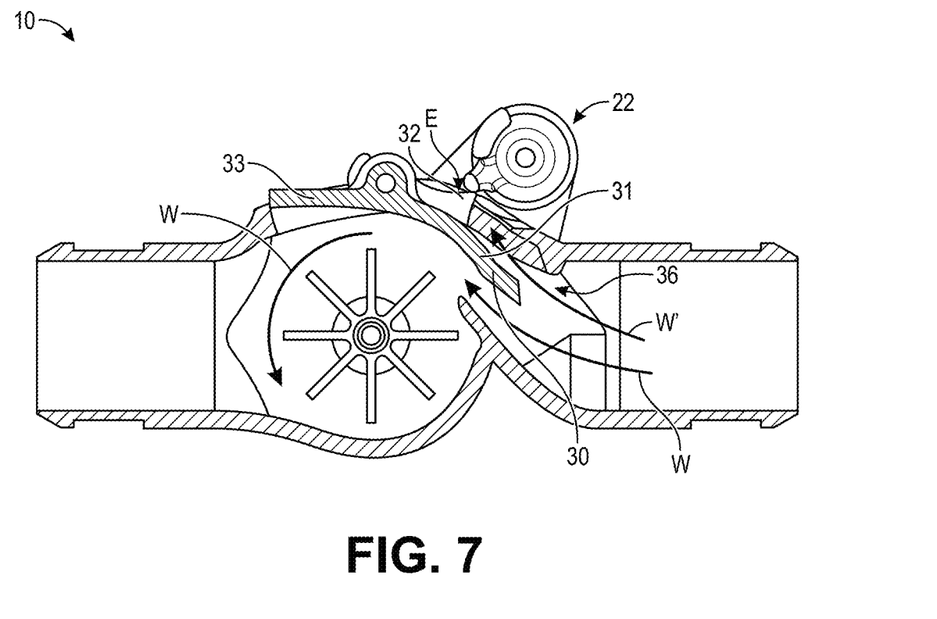

Referring to FIG. 7, as pressure exerted by the cam 24 on the projection 32 builds, (arrow E), it begins to overcome the tension of the biasing mechanism S1 exerted on the downstream side 33 of the flap 30, causing the upstream side 31 of the flap 30 to slowly rotate downwards in the clockwise direction. As the flap 30 begins to rotate downward in a clockwise direction, the bypass mechanism 10 begins to move from its closed position toward the open position and the flap 30 no longer seals against the body 16 of the bypass mechanism and a portion of the water from the inlet 12 is diverted (represented by arrow W') through an opening 36 created between the flap 30 and the body 16. The portion of the water flowing through the opening 36 does not reach the drive rotor 18 or the outlet 14 (or the APC) and instead exits the bypass mechanism 10 through opening 36. In this in between position, the remaining water flow (represented by arrow W) continues to pass through the drive rotor 18 and the outlet 14.

Figure 8:
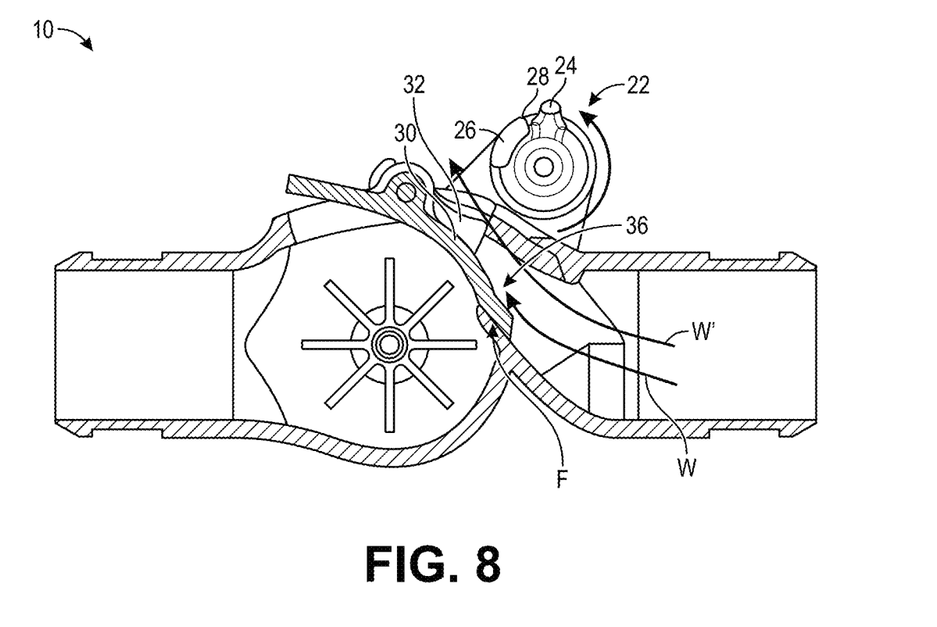

Eventually, the pressure on the projection 32 (which now includes water pressure from the water flowing in direction of arrow W') completely overcomes the tension of the flap biasing mechanism S1 and the flap 30 moves into the open position, illustrated in FIG. 8, where the flap 30 forms a seal against the bypass mechanism 10 and blocks water from flowing from the inlet 12 to the drive rotor 18 and the outlet 14 (represented by arrow F). Unlike other timed valves, the drive rotor 18 ceases operation as soon as the flap 30 moves to the open position, and remains inoperative until the pump is de-energized and the bypass mechanism 10 is reset, as described in more detail below.

When the flap 30 is in the open position, the bypass mechanism 10 is in its open position. Because water from the inlet 12 cannot reach the outlet 14, it also cannot flow to the APC, shutting off the APC. When the bypass mechanism 10 is in the open position, all (or nearly all) water flowing from the pump through the inlet 12 now exits the bypass mechanism 10 through the opening 36 along path W' instead of flowing to the drive rotor 18 and the outlet 14. Because water cannot reach the drive rotor 18, the drive rotor 18 stops rotating, in turn ceasing rotation of the gear stack 20 and the cam assembly 22. In some cases, the water flowing along path W' will exit an outlet of the bypass mechanism 10 directly into the swimming pool without passing through any jet-like orifice. In other cases, the water flowing along path W' will exit an outlet of the bypass mechanism 10 indirectly into the swimming pool.

As shown in FIG. 8, once the flap 30 (and in turn the bypass mechanism 10) is in its open position, the cam 24 no longer contacts the projection 32 and thus is no longer subjected to forces from the projection 32. In turn, the cam biasing mechanism S2 again biases the cam 24 back to its original position against the distal surface 28 of the cam pusher 26. Water pressure from water flow W' maintains the flap 30 in the open position, overcoming the tension of the flap biasing mechanism S1 against the downstream side 33 of the flap 30, and thus the cam assembly 22 remains in the position of FIG. 8 until the pump is de-energized and water no longer flows from the inlet 12 through the opening 36 (water flow W'). Along these lines, the flap 30 remains in the open position due to the water pressure from water flow W' until the pump is de-energized and the water pressure ceases. In this way, water pressure from water flow W' serves to move the flap 30 between its closed and open positions.

In some embodiments, as described above, the bypass mechanism 10 is configured so that one rotation of the cam pusher 26 corresponds to one predetermined timed cycle such that the APC runs from the time the pump is energized until the cam pusher 26 moves the flap 30 into the open position of FIG. 8. This predetermined timed cycle can correspond to the time it takes for the APC to effectively clean the body of water or other predetermined length of time.

Figure 9:
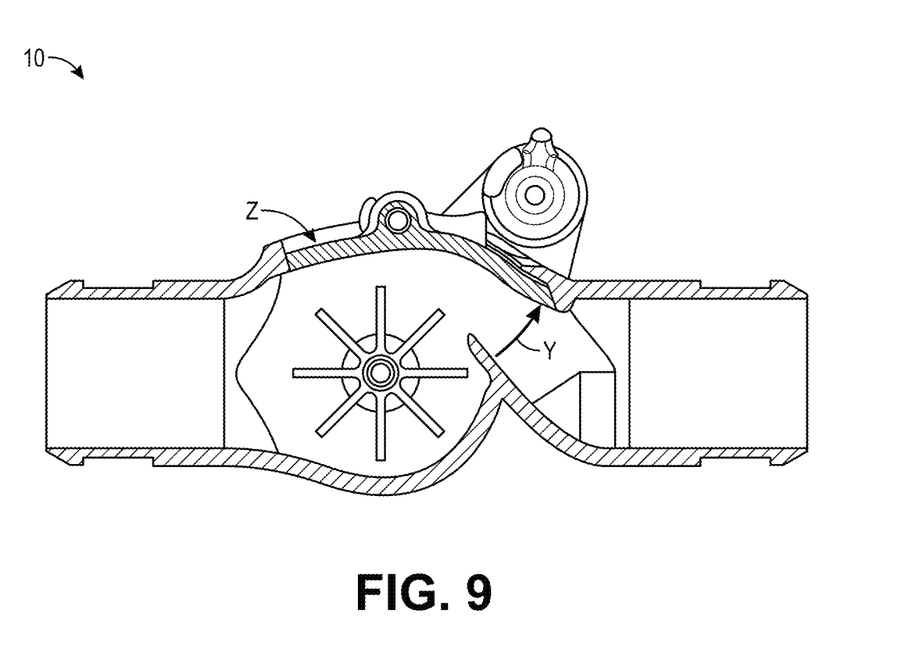
FIG. 9 is a side, cross-sectional view of the bypass mechanism of FIG. 1 after it has returned to the closed position.

Once the pump is de-energized and water stops flowing through the inlet 12 and out the opening 36, there is nothing to overcome the force exerted by the flap biasing mechanism S1 on the downstream side 33 of the flap 30 (arrow Z of FIG. 9), causing the flap biasing mechanism S1 to rotate the flap 30 in the counterclockwise direction (arrow Y) back to the closed position, where it forms a seal and blocks opening 36 and leaves a fluid path between the inlet 12 and the outlet 14. The bypass mechanism 10 is now back in its closed position and ready for the cycle to repeat itself once the pump is re-energized. In other words, once the pump is re-energized, the bypass mechanism will begin a new timed cycle. In this way, the bypass mechanism 10 is reset by the flap 30 returning to its closed position and thus will not simply commence where it left off when the pump is re-energized, but will start a new timed cycle. This is unlike traditional timed valves, which commence where they left off when the pump is re-energized instead of resetting to the beginning of a new cycle.

As noted above, those skilled in the art will recognize that the bypass mechanism could be configured to operate with a suction-side APC instead of a pressure-side APC as described with reference to the Figures. If used with a suction-side APC, the valve would be reversed such that the "inlet 12" points toward the APC and the "outlet 14" points toward the pump. If used with a suction-side APC, the bypass mechanism would selectively permit suction generated by the pump to draw water from the suction-side APC.

Exemplary concepts or combination of features of the invention may include:

A. A bypass mechanism for regulating operation of an automatic pool cleaner, wherein, after a cycle corresponding to a predetermined period of time has completed, the bypass mechanism prevents a pump of a swimming pool or spa from operating the automatic pool cleaner even if the pump remains energized and wherein the bypass mechanism rests when the pump is de-energized to begin a new cycle corresponding to the predetermined period of time.

B. An automatic pool cleaner assembly comprising an automatic pool cleaner and a bypass mechanism, wherein the bypass mechanism selectively permits water from a pump of a swimming pool or spa to drive the automatic pool cleaner, the bypass mechanism comprising:

a valve with an inlet and an outlet fluidly connected to and positioned between a pump of a swimming pool or spa and the automatic pool cleaner, with the inlet positioned to accept incoming water; a drive rotor driven by water received from the inlet;

a cam assembly driven by the drive rotor; and a flap movable between (1) a closed position in which water from the inlet flows through the drive rotor and the outlet and (2) an open position in which water from the inlet is prevented from flowing through the drive rotor and the outlet,     wherein the flap remains in the closed position until acted on by the cam assembly and wherein, after a predetermined period of time, the cam assembly moves the flap from the closed position to the open position.

C. A bypass mechanism comprising:

an inlet and an outlet fluidly connected to and positioned between a pump of a swimming pool or spa and the automatic pool cleaner, with the inlet positioned to accept incoming water; a flap; and     a drive rotor downstream of the flap, wherein:

the flap is movable between (1) a closed position in which water from the inlet flows through the drive rotor and the outlet and (2) an open position in which water from the inlet is prevented from flowing through the drive rotor and the outlet and is forced into a diverted path out of the bypass mechanism;

the flap remains in the closed position after the pump is energized until a predetermined period of time has lapsed;

water flowing in the diverted path (1) moves the flap to its open position after the predetermined period of time has lapsed and (2) maintains the flap in its open position until the pump is de-energized; and the flap moves to its closed position when the pump is de-energized.

D. A bypass mechanism comprising:
an inlet and an outlet fluidly connected to and positioned between a pump of a swimming pool or spa and the automatic pool cleaner, with the inlet positioned to accept incoming water; and
a drive rotor configured to rotate a cam assembly, wherein:
the cam assembly is configured to, after a predetermined period of time, move a flap of the bypass mechanism from (1) a closed position in which water from the inlet flows through the drive rotor and the outlet to (2) an open position in which water from the inlet is diverted into the swimming pool or spa and is prevented from flowing to the outlet and from flowing to the automatic pool cleaner; and
the predetermined period of time corresponds to a cleaning cycle of the automatic pool cleaner in the swimming pool or spa.

E. An automatic pool cleaner assembly comprising an automatic pool cleaner and a bypass mechanism, wherein the bypass mechanism permits water from a pump of a swimming pool or spa to drive the automatic pool cleaner for a predetermined period of time and wherein the bypass mechanism prevents water from the pump of the swimming pool or spa from driving the automatic pool cleaner after the predetermined period of time has passed and wherein, after the predetermined period of time has passed, the bypass mechanism diverts water from the pump directly through an outlet of a body of the bypass mechanism directly or indirectly into the swimming pool or spa.

F. A bypass mechanism comprising:
an inlet and an outlet fluidly connected to and positioned between a pump of a swimming pool or spa and the automatic pool cleaner, with the inlet positioned to accept incoming water; and
a drive rotor driven by water received from the inlet, wherein, after the pump has run for a predetermined period of time:
water from the inlet is prevented from reaching both the drive rotor and the outlet, ceasing operation of the drive rotor and preventing water from the pump from driving the automatic pool cleaner; and
the drive rotor remains inoperative even if the pump continues to run after the predetermined period of time has lapsed.

G. An automatic pool cleaner assembly comprising an automatic pool cleaner and a bypass mechanism, wherein the bypass mechanism selectively permits a pump of a swimming pool or spa to draw water from a suction-side automatic pool cleaner, the bypass mechanism comprising:
an inlet fluidly connected with the suction-side automatic pool cleaner;
an outlet fluidly connected with a pump of a swimming pool or spa;
a drive rotor driven by water drawn by the pump through the inlet;
a cam assembly driven by the drive rotor; and
a flap movable between (1) a closed position in which the pump draws water through the inlet and through the drive rotor and (2) an open position in which the pump does not draw water through the inlet or the drive rotor, wherein the flap remains in the closed position until acted on by the cam assembly and wherein, after a predetermined period of time, the cam assembly moves the flap from the closed position to the open position.

H. An automatic pool cleaner assembly comprising a suction-side automatic pool cleaner and a bypass mechanism, wherein the bypass mechanism permits a pump of a swimming pool or spa to draw water from the suction-side automatic pool cleaner for a predetermined period of time and wherein the bypass mechanism prevents the pump of the swimming pool or spa from drawing water from the suction-side automatic pool cleaner after the predetermined period of time has passed, wherein the predetermined period of time corresponds to a cleaning cycle of the suction-side automatic pool cleaner in the swimming pool or spa.

I. A bypass mechanism comprising:
an inlet fluidly connected with a suction-side automatic pool cleaner;
an outlet fluidly connected with a pump of a swimming pool or spa; and
a drive rotor driven by water drawn from the suction-side automatic pool cleaner through the inlet,
wherein, after the pump has run for a predetermined period of time:
the bypass mechanism prevents water from being drawn from the suction-side automatic pool cleaner, preventing water from reaching the drive rotor and ceasing operation of the suction-side automatic pool cleaner; and
the drive rotor remains inoperative even if the pump continues to run after the predetermined period of time has lapsed.

J A bypass mechanism or automatic pool cleaner assembly including any of the aspects identified in any of the previous statements A-I.

K. Methods for using the bypass mechanism or automatic pool cleaner assembly in any of the previous statements A-J.

These examples are not intended to be mutually exclusive, exhaustive, or restrictive in any way, and the invention is not limited to these example embodiments but rather encompasses all possible modifications and variations and combinations within the scope of any claims ultimately drafted and issued in connection with the invention (and their equivalents). For avoidance of doubt, any combination of features not physically impossible or expressly identified as non-combinable herein may be within the scope of the invention.

Although applicant has described devices and techniques for use principally with swimming pools, persons skilled in the relevant field will recognize that the present invention may be employed in connection with other objects and in other manners. Finally, references to "pools" and "swimming pools" herein may also refer to spas or other water containing vessels used for recreation or therapy and for which cleaning is needed or desired.

The foregoing is provided for purposes of illustrating, explaining, and describing embodiments of the present invention. Modifications and adaptations to these embodiments, including combinations of various features, will be apparent to those skilled in the art and may be made without departing from the scope or spirit of the invention. For avoidance of doubt, any combination of features not physically impossible or expressly identified as non-combinable herein may be within the scope of the invention.

What is claimed is:
1. A bypass mechanism for regulating operation of an automatic pool cleaner, wherein the bypass mechanism is configured such that:
(1) responsive to a lapse of a cycle corresponding to a predetermined period of time, and regardless of a state of a pump, the bypass mechanism prevents the pump of a swimming pool or spa from operating the automatic pool cleaner; and (2) responsive to the pump being de-energized after the lapse of the cycle, the bypass mechanism resets to allow the pump to operate the automatic pool cleaner to begin a new cycle corresponding to the predetermined period of time, wherein the bypass mechanism is configured such that when the pump is de-energized before the predetermined period of time has lapsed:
- a flap for an inlet remains in a closed position until the pump is re-energized;
- when the pump is re-energized, (1) the flap remains in the closed position until the predetermined period of time has lapsed, and (2) the flap moves to an open position once the predetermined period of time has lapsed; and
- the flap returns to the closed position when the pump is de-energized, which resets the bypass mechanism to begin the new cycle corresponding to the predetermined period of time.

2. The bypass mechanism of claim 1, further comprising:
an outlet, wherein the inlet and the outlet are fluidly connected to and positioned between the pump and the automatic pool cleaner, with the inlet positioned to receive incoming water;
a drive rotor driven by the incoming water received from the inlet; and
a cam assembly driven by the drive rotor.

3. The bypass mechanism of claim 2, wherein, in the closed position, the incoming water from the inlet flows through the drive rotor and the outlet and, in the open position, the incoming water from the inlet is prevented from flowing through the drive rotor and the outlet.

4. The bypass mechanism of claim 1, wherein the bypass mechanism is positioned and fluidly connected between the pump and the automatic pool cleaner.

5. The bypass mechanism of claim 1, wherein the bypass mechanism is within a hose connected to the automatic pool cleaner and the pump or the bypass mechanism is housed inside of the automatic pool cleaner.

6. The bypass mechanism of claim 2, wherein the flap is upstream of the drive rotor.

7. The bypass mechanism of claim 2, wherein the drive rotor by itself does not cause the flap to move between the open position and the closed position.

8. A bypass mechanism for regulating operation of an automatic pool cleaner, the bypass mechanism comprising:
an inlet configured to receive incoming water;
an outlet; and
a flap, wherein the flap is movable between (1) a closed position in which the incoming water from the inlet flows through to the outlet and (2) an open position in which the incoming water from the inlet is prevented from flowing to the outlet, wherein the bypass mechanism is configured such that:
(1) responsive to a lapse of a cycle corresponding to a predetermined period of time, and regardless of a state of a pump, the bypass mechanism prevents the pump of a swimming pool or spa from operating the automatic pool cleaner; and
(2) responsive to the pump being de-energized after the lapse of the cycle, the bypass mechanism resets to allow the pump to operate the automatic pool cleaner to begin a new cycle corresponding to the predetermined period of time.

* * * * *